United States Patent [19]
Swenson

[11] Patent Number: 5,893,384
[45] Date of Patent: Apr. 13, 1999

[54] SEISMICALLY TRIGGERED VALVE WITH MANUAL OVERRIDE

[76] Inventor: Ralph R. Swenson, P.O. Box 1249, Coulterville, Calif. 95311

[21] Appl. No.: 09/015,172

[22] Filed: Jan. 29, 1998

Related U.S. Application Data

[63] Continuation-in-part of application No. 08/909,900, Aug. 12, 1997.
[51] Int. Cl.⁶ .................................................. F16K 17/36
[52] U.S. Cl. ............................. 137/39; 137/38; 251/65
[58] Field of Search ........................ 137/38, 39; 251/65

[56] References Cited

U.S. PATENT DOCUMENTS 5,115,829   5/1992   Franzke ................................. 137/38
5,209,454   5/1993   Engdahl et al. ..................... 137/38 X

*Primary Examiner*—Gerald A. Michalsky
*Attorney, Agent, or Firm*—James B. Middleton

[57] ABSTRACT

A seismically triggered valve is designed to shut off gas supply during an earthquake. A valve member is pivoted within a valve body, the valve member being mechanically movable to the open position and movable by gravity to the closed position. A magnet is fixed to the valve member, and a ferromagnetic ball is free on a concave surface. The center of the concave surface is aligned with the magnet; but, when the valve is shaken, the ball moves and releases the magnet so the valve member closes by gravity. The valve body is formed integrally with an open top, and the sensor is received within the open top to close the top and properly locate the sensor. The valve can be closed at will by moving the ball off center, for example by a plunger, or by magnetically attracting the ball. To prevent inadvertent closing of the valve, baffles direct the incoming fluid away from the loose edge of the valve member.

14 Claims, 1 Drawing Sheet

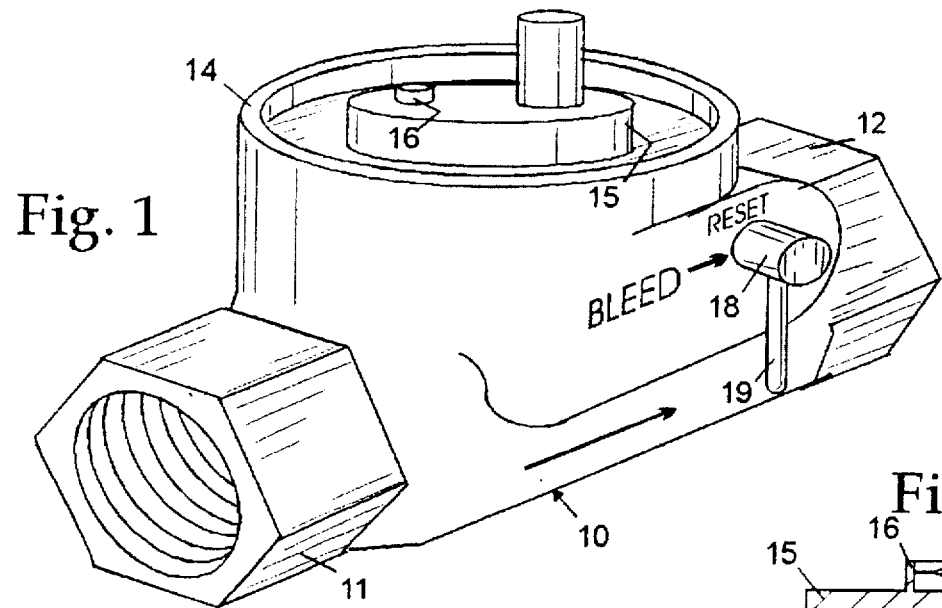
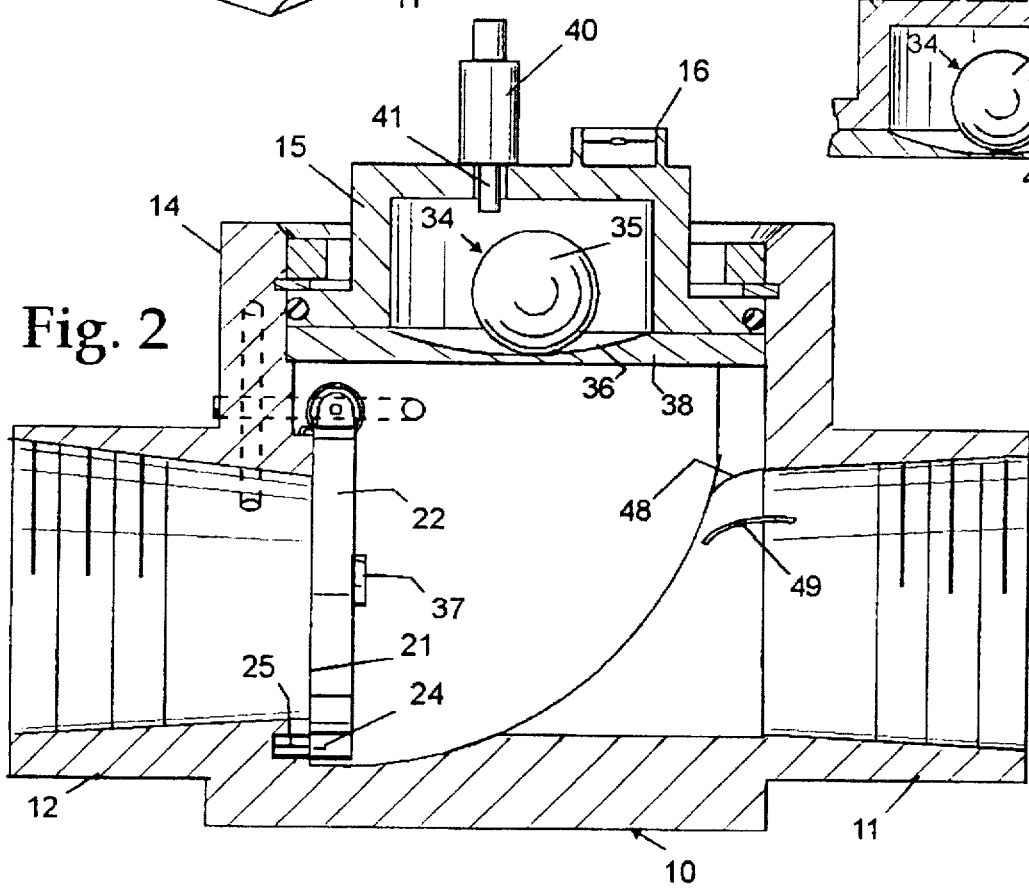

5,893,384

SEISMICALLY TRIGGERED VALVE WITH MANUAL OVERRIDE

CROSS-REFERENCE TO RELATED APPLICATION

This application is a continuation-in-part of the application by the inventors Ralph R. Swenson and Dale Dean, titled "Seismically Triggered Valve", filed Aug. 12, 1997, under application Ser. No. 08/909,900.

BACKGROUND OF THE INVENTION

1. Field of the Invention

This invention relates generally to automatically operable valves, and is more particularly concerned with a valve that is automatically closable on occurrence of a seismic event of a predetermined severity, and manually closable as desired.

2. Discussion of the Prior Art

In areas of the world in which earthquakes, or seisms, are reasonably expectable there is concern for collateral damage flowing from the seism. By way of example, even though a relatively slight amount of damage may be caused to a structure, it is possible that a gas line will be broken, and major damage may be caused by a gas explosion. Similarly, toxic or otherwise hazardous gases may be released into the atmosphere. In an effort to prevent collateral damage, there have been automatically operable valves and the like to terminate the flow of gas or other fluids early in the occurrence of the seismic event.

The prior art valves have generally been rather complex mechanically, frequently including one or more linkages that must be operated to open or close the valve. Other valves may be somewhat simpler, but none of the prior art valves is easily variable so that severity of the seism required to operate the valve can be changed at will. One exception to the last statement is the U.S. Pat. No. 5,115,829 to Franzke. This patent discloses a rather simple automatically operable valve, the sensitivity of which is relatively easy to change. However, the Franzke patent is somewhat crudely done, with a housing fabricated from sheet stock, and the device does not lend itself to mass manufacture or efficient operation. Also, there is no provision for activation of the valve manually, to close the valve when desired.

SUMMARY OF THE INVENTION

The present invention provides a seismically triggered valve having a unitary body, and a valve member pivotal between a valve-closed position and a valve-open position. The valve member is biased towards a valve-closed position; and, in the valve-open position, is held in place by magnetic attraction with a movable sensor member. Baffles may also be included to prevent fluid flow from urging the valve member towards the valve-closed position. The sensor member can be moved automatically by seismic activity to release the valve member to allow the valve member to move to a valve-closed position. The movable member comprises a ferromagnetic ball or the like within a spherical recess, the arrangement being such that the ball will tend to be centered in the lowest portion of the spherical recess, but can be easily moved from that position by shaking the valve. Further, the construction of the spherical recess is simple to make and assemble, while providing positive sealing of the valve body.

The valve is easily activated manually by urging the ball off center. In one embodiment of the invention the ball is moved by a plunger, and in another embodiment the ball is moved by magnetic attraction.

BRIEF DESCRIPTION OF THE DRAWINGS

These and other features and advantages of the present invention will become apparent from consideration of the following specification when taken in conjunction with the accompanying drawings in which:

FIG. 1 is a perspective view showing one form of valve made in accordance with the present invention;

FIG. 2 is a longitudinal cross-sectional view through the valve of FIG. 1; and,

FIG. 3 is a fragmentary view showing a modified form of the activation means shown in FIG. 2.

DETAILED DESCRIPTION OF THE EMBODIMENTS

Referring now more particularly to the drawings and to those embodiments of the invention here presented by way of illustration, the device shown in FIG. 1 includes a central valve body 10 with an internally threaded inlet 11 and outlet 12. The upper portion of the valve body 10 has a circular portion 14 for receiving the valve member. Centrally of the circular portion 14 there is a sensor housing 15 and a level 16. On the side of the valve shown in FIG. 1 there is a rod 18 projecting from the valve, with an operating handle 19 generally perpendicular thereto.

It should be understood that the present invention utilizes the structure of the valve disclosed in U.S. application Ser. No. 08/909,900, and constitutes an improvement thereof The complete disclosure of that application is incorporated herein by this reference.

For a better understanding of the valve of the present invention, attention is directed to FIG. 2 of the drawings. In FIG. 2 it should be noticed that the inlet 11 is on the right and the outlet 12 is on the left. Fluid flow is therefore from right to left.

The outlet 12 is shown as having a tapered pipe thread; and, the opening in the outlet continues to taper to provide a valve seat 21. In FIG. 2, a valve member 22 is shown in position against the seat 21 to close the valve to prevent fluid flow therethrough. At the lower end of the valve member 22 as shown in FIG. 2 there is an extension 24 which aligns with a magnet 25 adjacent to the valve seat 21. It will be understood that, when the valve 22 is in closed position, the magnet 25 assists in holding the valve member 22 against the valve seat 21.

Looking at the sensor 34, the sensor is made of a sensor ball 35 received within a spherical recess 36. The spherical surface provides initially low resistance to the displacement of the ball 35, with increasing resistance as the ball 35 is displaced further from the center.

The valve member 22 is held in its open position by attraction between a magnet 37 on the valve member 22 and the sensor ball 35, which is of ferromagnetic material. Thus, the magnetic attraction must be overcome for the ball 35 to move off center. The small resistance offered by the spherical recess 36, added to the magnetic resistance, is sufficient to prevent premature activation of the sensor.

On the top of the sensor housing 15 there is a bubble level 16 of a type well known. The level 16 allows one installing the valve to be sure the valve is level for best operation.

The automatic operation of the valve will be well understood from the above description and the disclosure in application Ser. No. 08/909,900. With this in mind, attention is still directed to FIG. 2 of the drawings, and the sensor 34. When the valve is open, the ball 35 will be centered on the spherical surface 35, and the valve member 22 will be positioned horizontally, with the magnet 37 directly under the ball 35.

In order to close the valve at will, one technique is to move the ball 35, and FIG. 2 illustrates one technique for moving the ball 35. There is a solenoid 40 having a plunger 41 extending therefrom. The plunger 41 is generally above the ball 35, but not located along the vertical centerline. As a result, when the solenoid 40 is energized, the plunger 41 will be extended and will contact the ball 35. Since the plunger 41 will engage a sloped surface of the ball 35, the ball 35 will be urged to the side, removing the ball from its position wherein it holds the valve member 22, and the valve member 22 will fall, closing the valve.

It is contemplated that the solenoid 40 will utilize a low voltage circuit. Since very little power will be required, the current can still be quite small. Those skilled in the art will also understand that fluid pressure may be used to close the valve. Instead of the solenoid 40, one might use a fluid operated cylinder to extend the plunger. The operation would be the same as just described.

FIG. 3 illustrates another modification of the manual closing arrangement. The device shown in FIG. 3 includes the sensor housing 15 with the sensor 34 therein, the sensor 34 including the ball 35. For moving the ball 35 at will, there is an electromagnet 42, which includes a coil 44 and a core 45. As is conventional, the core 45 extends through coil 44 and has an exposed face within the sensor housing 15.

Thus, when the coil 44 is energized, the core 45 will become magnetized, and the core 45 will tend to attract the ferromagnetic ball 35. The ball 35 will move towards the core 45, allowing the valve member 22 to drop, as has been previously described.

The above discussion relates to closing the valve whenever desired, but it is also important not to close the valve inadvertently. One phenomenon that could cause premature closing of the valve is the force of the rapid flow of fluid through the valve. Since the valve member 22 is in a horizontal position when the valve is open, and the free edge of the valve member 22 is adjacent to the inlet 11, it is at least possible that the fluid flow could urge the valve member 22 down, away from the ball 35.

To prevent the inadvertent closing of the valve, the inlet side of the valve is provided with baffles, or turning vanes, such as the baffles 48 and 49. The object of the baffles is to direct the fluid flow away from the valve member 22.

Those skilled in the art will understand that many forms of baffles, turning vanes and the like may be utilized; but, by way of example, FIG. 2 shows the valve housing itself shaped to provide a baffle 48, and a separate member provided at 49. Additional baffles and the like may be included as desired, or as needed to control the fluid flow. Many variations in both position and shape can be made as long as the baffles are disposed in the incoming fluid flow, before the edge of the valve member 22.

With the above and foregoing description in mind, it will be understood that the present invention provides, in a valve automatically closable by a seism or the like, means for closing the valve at will. The valve is held open by positioning a ferromagnetic ball over a magnet fixed to the valve member so the valve member will close when the ball is moved. In accordance with the present invention, the ball may be moved by extending a plunger to urge the ball away from its center location. In another embodiment of the invention, a magnet is used to attract the ball, and move it from its center location.

To prevent inadvertent closure of the valve, the present invention provides means for directing the fluid flow away from the open valve member. Many forms of baffles, turning vanes and the like may be used to control the fluid flow to achieve the desired result.

It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

What is claimed as invention is:

1. In an automatically operable valve comprising a valve body, an inlet for admitting fluid to said valve body, and an outlet for allowing fluid to exit from said valve body, a valve member for closing said outlet, said valve member being movable from a first position in which said outlet is open to a second position in which said outlet is closed, seismically sensitive magnetic means for holding said valve member in said first position, said valve member being movable to said second position on activation of said seismically sensitive magnetic means, and mechanical means for selectively moving said valve member from said second position to said first position, said seismically sensitive magnetic means including a magnet carried by said valve member, a concave surface having an apex at its lowest point, said apex being juxtaposed over said magnet carried by said valve member when said valve member is in said first position, and a ferromagnetic ball received on said concave surface, the improvement comprising manual closing means for closing said valve, said manual closing means including a means for urging said ferromagnetic ball away from said apex.

2. In an automatically operable valve as claimed in claim 1, the further improvement wherein manual closing means further includes a plunger for urging said ball away from said apex, a solenoid, said plunger being concentric with and moved by said solenoid.

3. In an automatically operable valve as claimed in claim 1, the further improvement wherein said means for urging said ball away from said apex comprises a magnet disposed adjacent to said ball for selectively attracting said ball towards said magnet.

4. In an automatically operable valve as claimed in claim 3, the improvement wherein said magnet dispose adjacent to said ball is an electromagnet selectively energizable for urging said ball towards said magnet disposed adjacent to said ball.

5. In an automatically operable valve comprising a valve body, an inlet for admitting a stream of fluid to said valve body, and an outlet for allowing said stream of fluid to exit from said valve body, a valve member for closing said outlet, said valve member being movable from a first position in which said outlet is open to a second position in which said outlet is closed, said valve member having a hinged end and a free end, said free end being pivotal about said hinged end, seismically sensitive magnetic means for holding said valve member in said first position, said valve member being movable to said second position on activation of said seismically sensitive magnetic means, and mechanical means for selectively moving said valve member from said second position to said first position, said seismically sensitive magnetic means including a magnet carried by said valve member, a concave surface having an apex at its lowest point, said apex being juxtaposed over said magnet carried by said valve member when said valve member is in said first position, and a ferromagnetic ball received on said concave surface, the improvement comprising baffle means for directing said fluid stream away from said free end of said valve member when said valve member is in said first position.

6. In an automatically operable valve as claimed in claim 5, the further improvement wherein said baffle means includes a portion of said valve body shaped for directing said fluid stream.

7. In an automatically operable valve as claimed in claim 5, the further improvement comprising at least one turning vane carried by said valve body and disposed in said fluid stream.

8. In an automatically operable valve comprising a valve body, an inlet for admitting a stream of fluid to said valve body, and an outlet for allowing said stream of fluid to exit from said valve body, a valve member for closing said outlet, said valve member being movable from a first position in which said outlet is open to a second position in which said outlet is closed, said valve member having a hinged end and a free end, said free end being pivotal about said hinged end, seismically sensitive magnetic means for holding said valve member in said first position, said valve member being movable to said second position on activation of said seismically sensitive magnetic means, and mechanical means for selectively moving said valve member from said second position to said first position, said seismically sensitive magnetic means including a magnet carried by said valve member, a concave surface having an apex at its lowest point, said apex being juxtaposed over said magnet carried by said valve member when said valve member is in said first position, and a ferromagnetic ball received on said concave surface, the improvement comprising baffle means for directing said fluid stream away from said free end of said valve member, and manual closing means for closing said valve, said manual closing means including a means for urging said ferromagnetic ball away from said apex.

9. In an automatically operable valve as claimed in claim 8, the further improvement wherein said manual closing means includes a plunger for urging said ball away from said apex, a solenoid, said plunger being concentric with and moved by said solenoid.

10. In an automatically operable valve as claimed in claim 8, the further improvement wherein said manual closing means includes a plunger for urging said ball away from said apex, a fluid operated cylinder, said plunger being selectively projectable from said fluid operated cylinder.

11. In an automatically operable valve as claimed in claim 8, the further improvement wherein said means for urging said ball away from said apex comprises a magnet disposed adjacent to said ball for selectively attracting said ball towards said magnet.

12. In an automatically operable valve as claimed in claim, the improvement wherein said magnet is an electromagnet selectively energizable for urging said ball towards said magnet.

13. In an automatically operable valve as claimed in claim 8, the further improvement wherein said baffle means includes a portion of said valve body shaped for directing said fluid stream.

14. In an automatically operable valve as claimed in claim 8, the further improvement comprising at least one turning vane carried by said valve body and disposed in said fluid stream.

* * * * *